Figure 1:
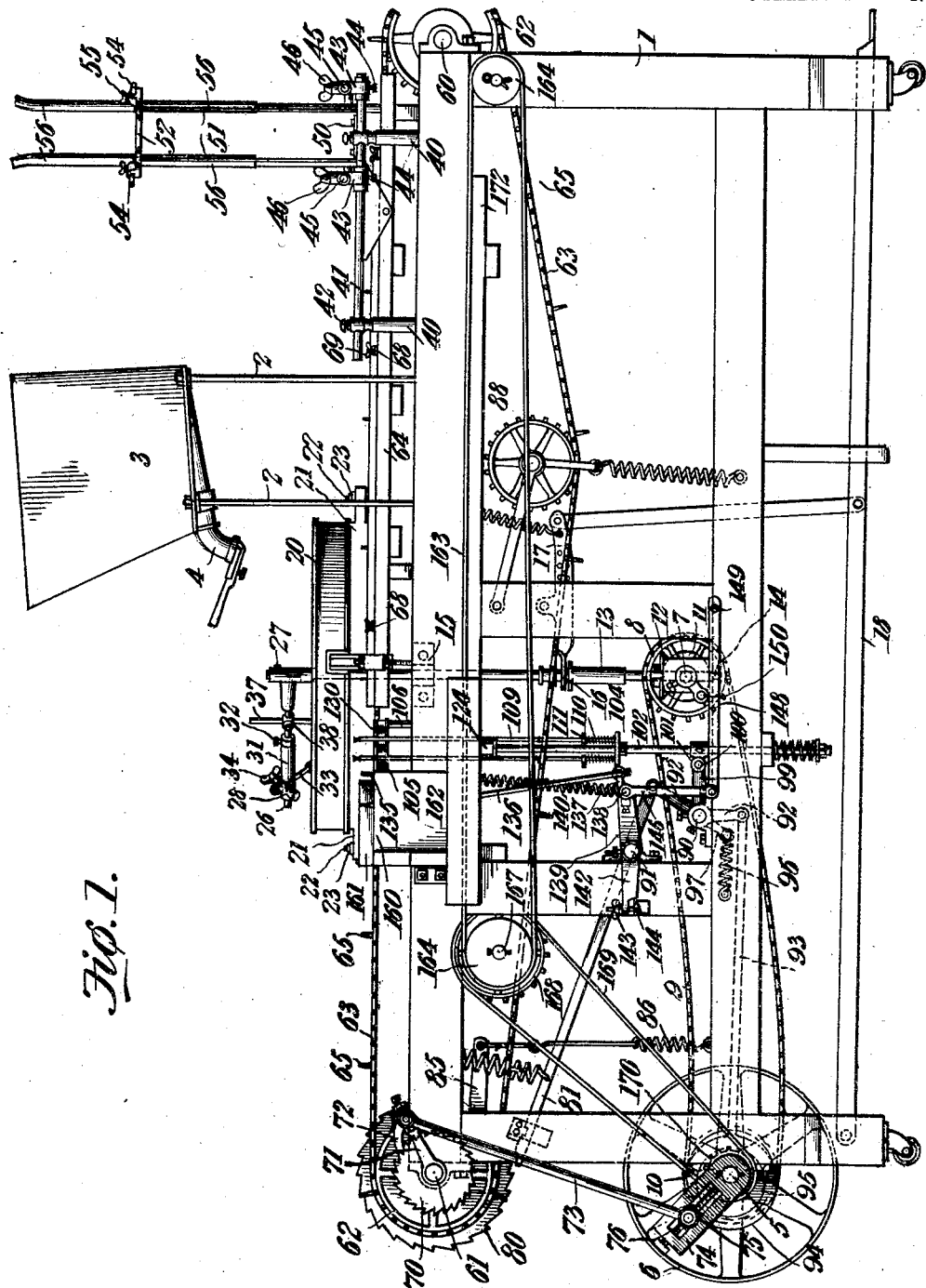

No. 788,222. PATENTED APR. 25, 1905.
J. F. SCOTT & A. B. CURTIS.
MACHINE FOR ICING CAKES.
APPLICATION FILED APR. 8, 1904.

5 SHEETS—SHEET 3.

Witnesses

Job F. Scott
Albert B. Curtis Inventors
by C. A. Snow & Co
Attorneys

No. 788,222. PATENTED APR. 25, 1905.
J. F. SCOTT & A. B. CURTIS.
MACHINE FOR ICING CAKES.
APPLICATION FILED APR. 8, 1904.
5 SHEETS—SHEET 4.
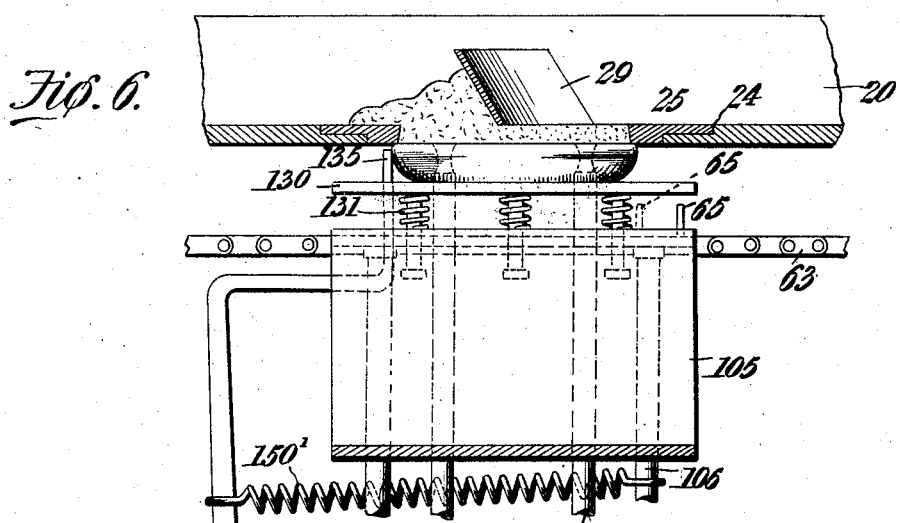
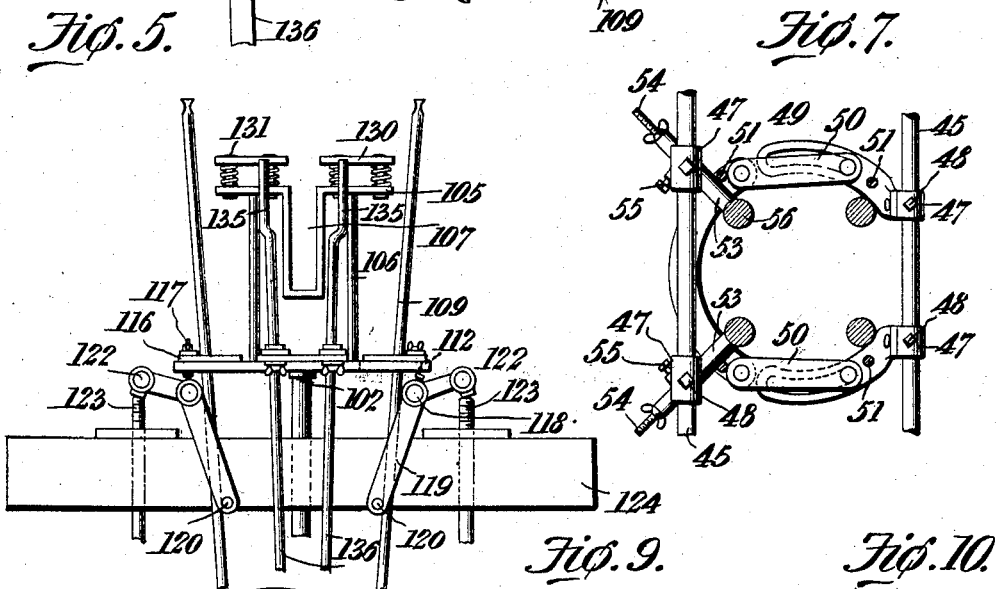
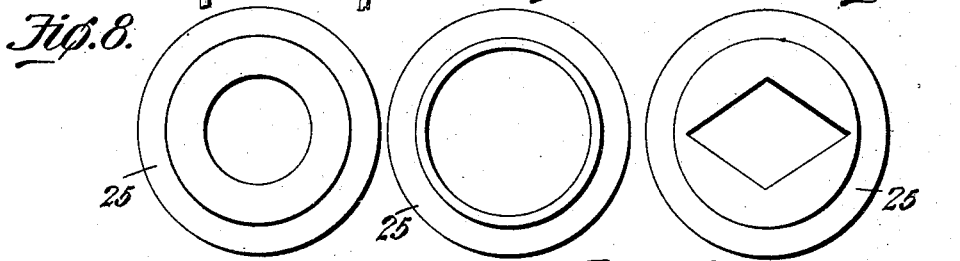
Witnesses
Job F. Scott and
Albert B. Curtis Inventors
by C. A. Snow & Co.
Attorneys No. 788,222. PATENTED APR. 25, 1905.
J. F. SCOTT & A. B. CURTIS.
MACHINE FOR ICING CAKES.
APPLICATION FILED APR. 8, 1904.

5 SHEETS—SHEET 5.

Witnesses

Job F. Scott
Albert B. Curtis
Inventors by C. A. Snow & Co.
Attorneys

No. 788,222.

Patented April 25, 1905.

UNITED STATES PATENT OFFICE.

JOB F. SCOTT AND ALBERT B. CURTIS, OF TOLEDO, OHIO, ASSIGNORS, BY DIRECT AND MESNE ASSIGNMENTS, TO NATIONAL BISCUIT COMPANY, OF JERSEY CITY, NEW JERSEY, A CORPORATION OF NEW JERSEY.

MACHINE FOR ICING CAKES.

SPECIFICATION forming part of Letters Patent No. 788,222, dated April 25, 1905.

Application filed April 8, 1904. Serial No. 202,256.

*To all whom it may concern:*

Be it known that we, JOB F. SCOTT and ALBERT B. CURTIS, citizens of the United States, residing at Toledo, in the county of Lucas and State of Ohio, have invented a new and useful Machine for Icing Cakes, of which the following is a specification.

This invention relates to machines for applying icing, jelly, and like substances to cakes, biscuits, and other articles.

One of the principal objects of the invention is to construct a machine in which a layer of icing, jelly, or the like may be applied to the surface of cakes or biscuits and in which provision is made for applying the material in a perfectly smooth layer and for regulating the thickness of the layer in accordance with the character of the article.

A further object of the invention is to provide a device of this character in which provision is made for adjusting all parts of the mechanism, so that cakes or biscuits of different size may be treated and the quantity and shape of the layer, as well as the thickness, may be accurately governed.

A still further object of the invention is to provide a novel form of cake-feeding mechanism in which feeding devices are so constructed and operated as to prevent all danger of injury to the cake, and, further, to provide for the positive removal of the cake from icing position, so that there will be no danger of its being retained by the more or less adhesive icing or jelly.

With these and other objects in view, as will more fully hereinafter appear, the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 2:
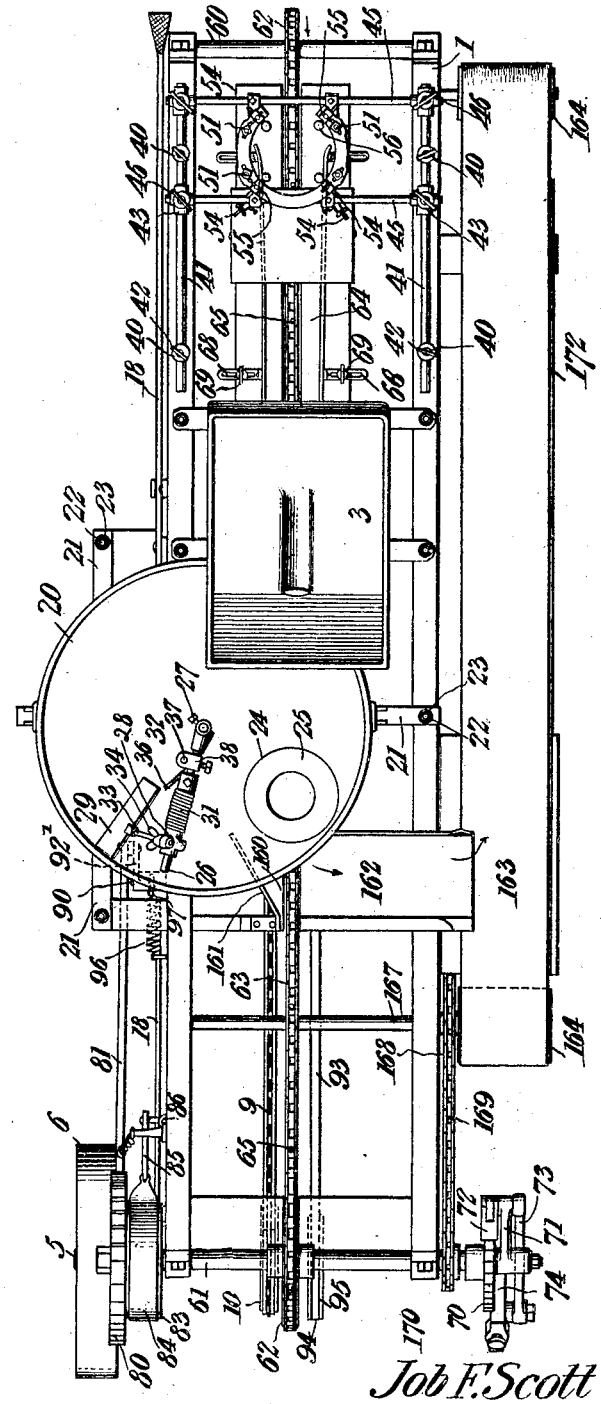
Figure 3:
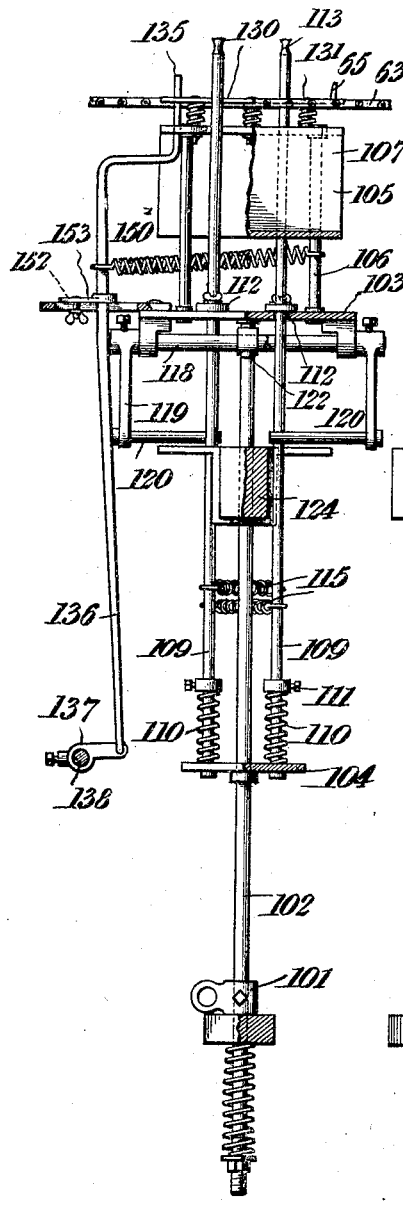
Figure 4:
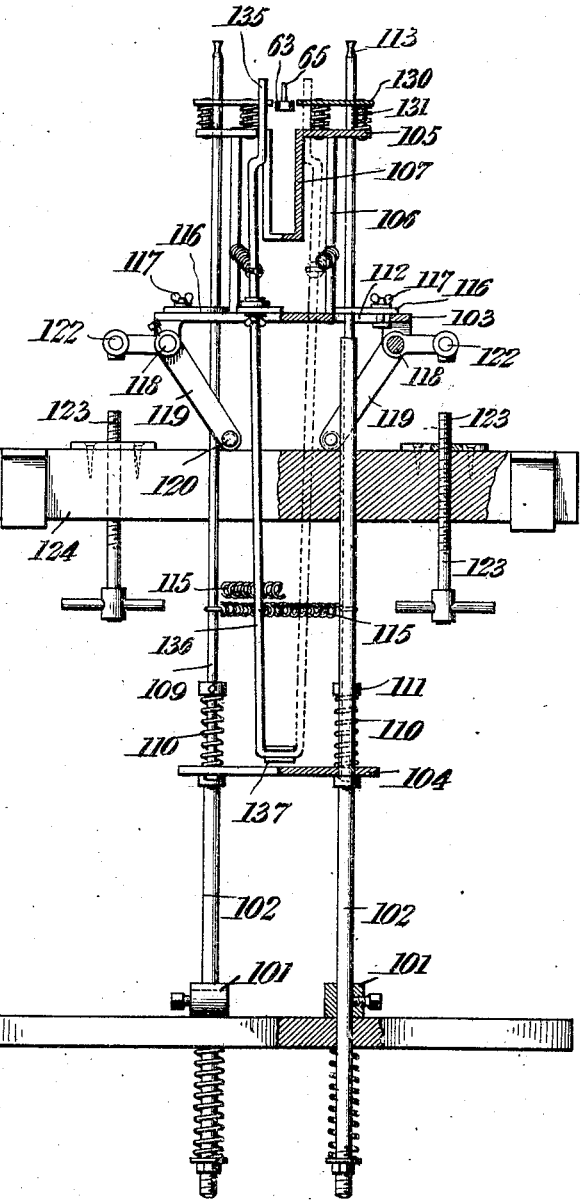
Figure 11:
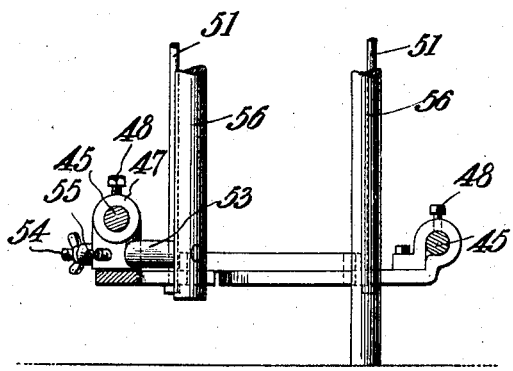
Figure 12:
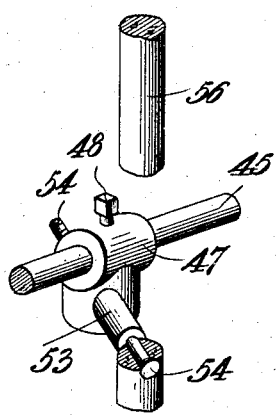
Figure 13:
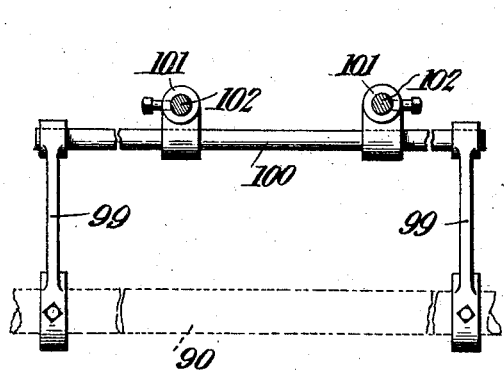
Figure 14:
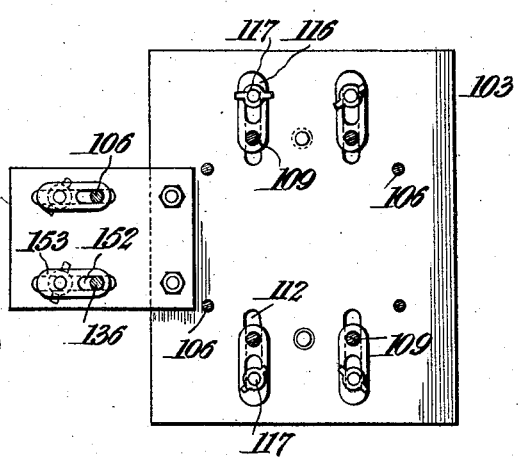

In the accompanying drawings, Figure 1 is a side elevation of an icing-machine constructed in accordance with the invention. Fig. 2 is a plan view of the same. Fig. 3 is a side elevation, partly in section, of a portion of the cake-receiving table and cake-gripping mechanism. Fig. 4 is a similar view looking at right angle to Fig. 3. Fig. 5 is a view of the upper portion of the cake-receiving table and grippers. Fig. 6 is a detail sectional view showing the method of applying icing to a cake. Fig. 7 is a detail sectional view of a portion of the cake-reservoir. Figs. 8, 9, and 10 are detail views of different forms of interchangeable molding-rings. Figs. 11 and 12 are detail views of portions of the adjustable cake reservoir or magazine. Fig. 13 is a sectional plan view of a portion of the machine, partly on the line 13 13 of Fig. 3. Fig. 14 is a similar view on the line 14 14 of Fig. 3.

Similar numerals of reference are employed to indicate corresponding parts throughout the several figures of the drawings.

The machine is intended principally for the application of icing to small cakes or biscuits when large quantities of articles must be quickly iced and prepared for the market, and while throughout the specification the mechanism is referred to generally as an "icing-machine" it is to be understood that it may be employed for the application of jellies or like material to cakes or biscuits or for the spreading of layers of any similar class of material on articles of any character without departing from the invention.

The main working parts of the mechanism are supported on a suitable frame 1, which may be formed of wood or metal, and from the upper portion of this frame extends standards 2, serving as supports for a reservoir 3, in which the icing is placed, the delivery of the icing being controlled by a suitable valve 4, and the bottom of the reservoir is inclined in order that all of the contents thereof may be discharged by gravity.

At one end of the machine are arranged bearings for the reception of a shaft 5, having at one end a belt-wheel 6, which may be driven from any suitable power, and from this shaft all of the movable parts of the machine receive motion.

At a point intermediate of the length of the frame is a transversely-disposed shaft 7, adapted to bearings and provided with a sprocket-wheel 8, which is connected by a link belt 9 to a sprocket-wheel 10 on the main shaft 5. The shaft 7 also carries a bevel-gear 11, intermeshing with a similar gear 12, arranged at the lower end of a two-part shaft 13, having a lower step-bearing 14 and an upper bearing 15, that is disposed adjacent to the upper portion or table of the framework. The shaft 13 is made in two sections, which may be united or coupled together by a clutch 16 of any suitable construction, and in the present instance the movable clutch member is connected by a spring-held lever 17 to a pivoted bar 18, arranged at a convenient point, so that when depressed by the operator the mechanism may be stopped or started as desired. The upper end of the shaft 13 extends through an opening formed in the center of a circular tray 20, that is supported by cross-bars 21, and at the ends of the cross-bars are openings for the passage of screws 22, the lower ends of which are rigidly secured to the frame. The screws each carry two nuts 23, by means of which the bars may be adjusted vertically and locked in adjusted position, thus permitting adjustment of the vertical height of the tray in accordance with the thickness of the cakes or other articles to be iced. On the bottom of the tray is an opening 24, into which are fitted molding-rings 25, of a shape and size governed by the character of the article being iced, and a plurality of rings are employed and made interchangeable, so that the icing may be applied in the usual circular layers or may be of any fanciful design, if desired, and the cakes to be iced are pressed upward against these molding-rings, so as to receive icing from the tray 20, the supply of icing being constantly maintained in the latter by permitting its gradual flow from the main reservoir 3.

To the upper end of the shaft 13 and at a point above the bottom of the tray is secured an arm 26, held in place by a suitable set-screw 27 to permit of vertical adjustment, and at the end of the arm is pivotally mounted a collar 28, carrying the scraper-blade 29, which travels along the bottom of the tray, passing over the opening 24 once during each revolution and forcing through the opening icing or other material which may be collected in advance of it. The scraping-blade 29 is held in vertical contact with the upper surface of the tray-bottom by means of a torsion-spring 31, one end of which is secured to the collar 28, while the opposite end is secured to a fixed collar 32 on the arm 26, the fixed collar being held in place by a set-screw in order that the stress of the spring may be adjusted and the angular position of the scraping-blade 29 may be conveniently adjusted by extending its carrying-bar 33 through a suitable opening formed in a lug carried by the collar 28, a thumb-screw 34 being used to lock the blade-carrying bar in any position to which it may be adjusted.

In order to prevent the accumulation of the icing or other material at the central portion of the tray or that portion between the inner end of the scraping-blade and the shaft 13, a deflector-blade 36 is used, said blade being carried by an arm 37, extending through a suitable opening formed in a collar 38, carried by the arm 26, and being adjustable on the arm in order that it may be held in proper relation to the bottom of the tray and to the scraping-blade. The deflector-blade is arranged on a curved line with respect to the scraping-blade, so that any material which may tend to accumulate at the center of the tray will be caught by this blade and moved outward in the path of the scraping-blade.

At one end of the machine are arranged a number of standards 40, forming supports for a pair of parallel rods 41, which may be adjusted longitudinally of the frame and locked in adjusted position by means of set-screws 42. The bars 41 carry collars 43, which may be adjusted longitudinally of the bars and locked in position by set-screws 44, and in the collars are formed openings for the passage of transverse rods 45, which when adjusted in place are locked by set-screws 46. The two rods 45 serve as supports for a reservoir or holder in which the cakes or biscuits to be iced may be placed and automatically fed one by one from the bottom of the reservoir to a position beneath the icing-tray.

Secured to the rods 45 and adjustable longitudinally thereof are a number of collars 47, which may be locked in adjusted position by set-screws 48. These collars are secured to or form a part of an approximately circular sectional carrier 49, the sections of which are adjustably connected together by straps 50 in order to permit of adjustment of the size of the carrier in accordance with the size of the cakes or other articles to be treated. The carrier is connected by a plurality of rods 51 to an upper sectional carrier 52 of similar shape and size, and on both carriers are lugs 53, having openings for the passage of rods 54, which when adjusted are locked in place by set-screws 55. The circular rods 54 are secured to vertical rods 56, and in the present instance four of such rods are used and spaced at equidistant intervals in order to form a holder for the cakes or other articles to be treated, and the upper ends of these rods are slightly flared in order to facilitate the introduction of the cakes. Two of the rods are extended down to the table of the machine, while the other two are held at a distance from the table equal to or slightly greater than the thickness or height of the cake or biscuit to be treated, so that the lowermost cake or biscuit may be fed outward under these two rods and conveyed to the icing-tray. It will be observed that every part of the reservoir or holder is adjustable, so that the distance between the rods may be varied in order to increase or decrease the size of the reservoir. The rods are also made sectional and of telescopic nature, so that they may be adjusted in order to alter the capacity of the reservoir.

At the feeding end of the machine are arranged bearings for the reception of a transverse shaft 60, and at the opposite end are bearings to receive a transverse shaft 61, and on these two shafts are sprocket-wheels 62, that are connected by a link belt 63, the upper run of which is slightly below and parallel with the bed or table 64, and said bed or table has a centrally-disposed longitudinal slot to receive said belt. The link belt is provided at equidistant intervals with pins 65, which in passing through the lower portion of the reservoir or holder will engage the lowermost cake or biscuit and force the same from the reservoir and along the bed or table to the icing-tray. In order to prevent lateral displacement of the cake during movement along the table, a pair of guiding-straps are held in place by slotted brackets 68, which may be locked in place by thumb-screws 69, the slotted connection permitting adjustment of the distance between the width of the guiding-straps in accordance with the width of the cake or biscuit being treated.

In order to actuate the link belt 63, the shaft 61 is provided with a ratchet-wheel 70, and on the end of the shaft is pivoted an arm 71, carrying a pawl 72, engaging the ratchet-wheel. The arm 71 is connected by a rod 73 to a crank 74, that is secured to the end of the shaft 5. This crank is slotted for the greater portion of its length and carries in the slot a threaded block 75, having a projecting wrist-pin for connection to the rod 73. Through the threaded portion of the block extends a screw 76, having at its outer end a head or nut, which may be engaged by a suitable tool in order to turn the screw, and thus adjust the position of the block 75 to a greater or less distance from the center of rotation of the shaft 5 and by so doing alter the throw of the crank and adjust the extent of movement of the pawl 72, and consequently of the feeding-chain, in accordance with the size of the cakes being treated.

During one portion of the operation it is desirable that the feeding-chain receive a slight backward movement in order that the feeding-pins may be removed from contact with the cakes or other articles or to such position as to avoid danger of breaking the cakes, and for this purpose the shaft 61 carries a ratchet 80, with which may engage a pawl-bar 81, receiving movement in the manner hereinafter described and serving to move the chain in a direction opposite to that in which it travels during the feeding movement; but this rearward movement is limited, being only for a fraction of an inch and being permitted by the slack of the chain. In order to prevent movement of the shaft and chain to an extent greater than that imparted by the feeding-belt, the shaft is provided with a friction-drum 83, around which passes a band-grip 84, that is connected at one end to a lever 85, normally held under the stress of a spring 86, the friction-band offering sufficient resistance to the shaft to prevent excessive movement of the feeding device under acquired momentum. The lower run of the chain 63 is engaged by an idler 88, that is normally held under spring tension, and serves to take up unnecessary slack of the feeding-belt, and thus to some extent assist in regulating the feed.

In suitable bearings carried by the lower portion of the frame is a transversely-disposed shaft 90, arranged at a short distance from and parallel with the shaft 7, and at a point above and to the rear of the shaft 90 are bearings for a rock-shaft 91, also extending transversely of the frame. The shaft 90 is provided with a depending rocker-arm 92, connected by a rod 93 to an eccentric-strap 94, the latter encircling an eccentric 95 on the main shaft 5, and at each revolution of the main shaft a rocking movement is imparted to said shaft 90. This movement of the shaft 90 is transmitted from a rocker-arm 92' at one end of the shaft by the pawl-bar 81, and the shaft is restored to initial position by a tension-spring 96, connected to a second rocker-arm 97 on the end of the shaft.

Secured to the shaft 90 are two rocker-arms 99, that are connected together by transversely-disposed bar 100, and said transversely-disposed bar serves as a carrier for a cake-receiver, to which the cakes or biscuits are delivered by the link belt in successive order and moved upward by the receiver to a position under the icing-tray.

Secured to the transverse bar 100 are two collars 101, each carrying a vertical lifter-rod 102, and said lifter-rods are permanently secured to two superposed plates 103 and 104, which move up and down, as dictated by the eccentric or cam on the shaft 5. Above the uppermost plate is a plate 105, that is supported by rods or standards 106, rising from the plate 103, and said upper plate is centrally bent to form a passage 107 for the feeding-belt. Extending loosely through openings in the lower plate 104 are the reduced end portions of a number of cake-engaging rods 109, that are normally held in an elevated position by helical compression-springs 110, surrounding the rods and bearing at one end against the upper surface of the plate and at the opposite end against a collar 111, which may be adjusted on the rod in order to vary the effective force of the spring. The upper ends of the several rods pass through pairs of parallel slots 112, formed in the plate 103, and also enlarged notches formed in the edges of the plate 105, and the extreme upper ends of said rods are recessed and provided with heads 113, which engage with the upper surface of the edge portion of the cake or biscuit and are pulled down in the manner hereinafter described and serve to positively move the cake or biscuit away from the molding-ring and prevent the clinging of the cake to the ring, due to the adhesive properties of the icing. The several cake-engaging rods are connected in pairs by springs 115, which normally serve to keep the rods as close together as the limits of the slots 112 will permit, and in order to adjust these guiding-slots, and thus vary the quickness of approach of the rod, the plate 103 serves as a support for a plurality of slotted plates 116, fitted over the slots 112 and locked in adjusted position by thumb-screws 117. The slots of the plates 116 really constitute the guiding means and by suitable adjustment may vary the inward movement of the rods in accordance with the diameter of the cake or biscuit which they are to engage. In order to spread the rods and release a cake after the icing operation has been completed, the plate 103 is provided with dependent bearings for reception of shafts 118, carrying arms 119, that are each provided with transverse rod-engaging bars 120. At the central portion of the rock-shaft is a rocker-arm 122, which on the descent of the cake-receiver will come into engagement with the upper ends of adjustable stop-screws 123, carried by a bar 124, that forms a rigid member of the frame. The screws may be adjusted in order to engage with the rocker-arms 122 at any desired point in the downward travel of the cake-receiver and when so engaged will cause upward movement of the rocker-arm and outward spreading movement of the cross-bars 120, so that the cake-engaging rods will be forced apart in order to release the cake, and when the cake-receiver is released the springs 115 will again draw the rods together for engagement with a fresh cake.

The cake to be treated is received on a small plate or table 130, that is mounted on suitable springs 131, carried by the upper plate 105, the springs serving to permit free yielding of the plate when the top of the cake engages against the molding-ring, and thus preventing injury to the cake. The cake-receiving table 130 is normally arranged in the horizontal plane of the upper table or bed 64, and as the cakes are fed in successive order they will move onto the table 130 and will be raised by the table to the molding-ring. In order to prevent the cakes moving beyond the table 130 should the feeding movement be abrupt, a pair of guard-pins 135 are employed. These pins project into suitable slots formed in the edges of the plates 105 and 130, and they are carried by vertically-disposed rods 136, which are connected by collars 137 to a transverse rod 138.

The rod 138 is carried by a pair of rocker-arms 139, secured to the rock-shaft 91, and a spring 140, connected to one of these arms, serves normally to hold them in elevated position, the movement being limited by a rocker-arm 142, carrying at its outer end a stop-screw 143, which may be engaged by a bracket 144, projecting from the side of the frame. The screw permits of the necessary adjustment of the movement of the rocker-arms 139, and thus varies the extent of upward movement of the stop-pins in accordance with the thickness of the cake or biscuit to be treated. The outer end of one of the rocker-arms 139 is connected by a link 146 to one end of a pivoted lever 148, the opposite end of which is fulcrumed in a pin 149, extending from the frame, and the lever 148 engages a cam 150, carried by the shaft 7 and properly timed so that once during each revolution of the shaft the cam will depress the lever and serve to depress the pins 135 until they are below the cake-receiving table 130, and thus permit the discharge of the cake from the table. The two rods 136 pass through guiding-slots 152, formed in the strips 153, that are adjustably secured to the plate 103, and these slotted strips serve to limit the inward movement of the stop-pins 135 in accordance with the size of the cake, the rods and pins being normally pulled inward under the stress of springs 150', which extend between the rods 136 and fixed portions of the carrier.

At a point beyond the table 130 is a cake-receiving table 160, at the end of which is a diagonal strip 161, against which the cakes are forced by the feeding-pins, and when they engage this diagonal strip the cakes will be deflected laterally and pass to a chute 162, down which they travel by gravity to a receiving-belt 163, that is supported on suitable pulleys 164 at the side of the frame. One of the belt-pulleys is mounted on a shaft or stud 167, and this shaft also carries a sprocket-wheel 168, that is connected by a link belt 169 to a similar sprocket-wheel 170 on the main shaft 5, and this receives its movement from the main driving-shaft of the machine. The upper run of the belt is supported by a stationary strip 172 in order to support the weight of the cakes, and as the latter are traveled toward the feed end of the machine they are removed by the attendants and placed in proper position on drying-trays or similar supports in order that the icing may dry and the cakes be prepared for the market.

In the operation of the machine the icing, jelly, or other material is allowed to flow gradually from the main reservoir 3 to the tray 20 and a molding-ring of proper size and shape is placed in the opening of the tray. These parts being in readiness, the cakes or biscuits are piled in the reservoir at the feeding end of the machine and the mechanism is started into operation. The cakes are fed one by one from the bottom of the reservoir, and until the first cake reaches icing position the shaft 13 remains stationary. The clutch 16 is then operated and the shaft revolves, carrying with it the scraper. The first cake is forced onto the table 130, and its movement is checked by the pins 131. The table 130 then moves upward, together with all of the supporting-plates and the cake-engaging rods, and as the rocker-arms 122 move from contact with the screws 123 the rods are allowed to move inward to engage with the sides of the cake, being held in engagement with the cake by the springs 115. The upward movement imparted to the cake-reservoir forces the cake against the lower face of the molding-ring, and should the cake be too thick the spring 131 will permit yielding of the table, so that the cake will not be injured; but should the cake be thinner than usual the upper ends of the rods will engage with the molding-ring or the bottom of the tray and side rods will yield, the springs 110 permitting the continuation of the upward movement of the cake-carrier after the movement of the rods has been stopped. The scraping-blade then passes over the molding-ring and forces the icing or other material over the top of the cake and in a smooth layer, the thickness of which is determined by the thickness of the molding-ring, and the end of the blade is such that the scraping operation will leave the upper face of the icing smooth and level. The cake-receiver then moves down, and should the adhesive properties of the icing tend to retain the cake in position the upper ends of the cake-engaging rods will positively detach the cake and cause it to move down with the table 130. During the outward movement the rocker-arm 122 engages with the screws 123 and the several cake-engaging arms are moved outward to engage the cake, and at the same time the pins are moved down below the level of the table and the feeding-pin engages the cake and moves it across the table onto the table 160, where by engagement with the diagonal deflecting-strip 161 it will be forced to a delivery-chute 162. When a feeding-pin has moved the cake to proper position on the table 130, which is advancing with the pin, it will be drawn back a short distance, so that when the cake again moves down there will be no danger of its engaging with the pin during the downward movement, and thus breaking or injuring the edge of the cake. This movement is effected by the previously-described ratchet-wheel 80 and the pawl 81, the movement being limited, and in practice it is found that a mere fraction of an inch is sufficient to give necessary clearance.

It will be observed that all of the parts of the mechanism are adjustable in order that cakes of any width or any thickness may be treated. The main receiving-reservoir from which the cakes are fed is adjustable in all its parts, as are also the strips 161, forming the side guards for the cakes during their movement from the reservoir to the icing-table. The horizontal plane of the icing-tray may be adjusted in accordance with the height or width of the cakes, and the molding-rings are interchangeable to permit the application of icing layers of circular, diamond shape, or any other desired contour. The scraping-blade is adjustable both as regards its radial distance from the center of motion as well as the angle which it assumes to the bottom of the tray, and this latter is important inasmuch as the angle may vary in accordance with the character of the material being applied to the cakes. The several parts of the cake-receiver are also adjustable, so that cakes of any size may be successively treated, and the feeding movement is also adjustable, it being merely necessary to adjust the position of the wrist-pin-carrying block 75 in order that the extent of feeding movement may be proportioned to the width of the cakes or biscuits.

Throughout the claims the term "icing-machine" is employed as a matter of convenience, it being understood that all machines for the application of a layer or filling of icing, jelly, or any other plastic or semiplastic material to cakes, biscuits, or other articles are included in said term.

Having thus described the invention, what is claimed is—

1. In combination, a tray having an opening, a vertical shaft extending through an opening at the center of the tray, an arm adjustably secured to the shaft, a scraper-blade adjustably secured to the arm, means for varying the angular position of the blade with respect to the tray, and means for presenting articles below the opening 2. In combination, a tray, having an opening, a vertical shaft extending through an opening in the center of the tray, an arm adjustably secured to said shaft, a scraper-blade adjustably secured to the arm, a deflector carried by the shaft and serving to force material from the center of the tray into the path of movement of the blade, and means for presenting articles below the opening.

3. In an icing-machine, a tray for receiving a limited quantity of icing, said tray having an opening, means for presenting cakes under the opening, a scraping-blade adapted to travel over the bottom of the tray and opening, and an icing-reservoir mounted above the tray and having an adjustable means for the continuous feed of icing to said tray.

4. In combination, an endless-chain carrier, means for intermittently moving the same in one direction, and means for reversing the direction of movement to an extent less than that of the feeding movement after the completion of such feeding movement.

5. In combination, a reservoir, an icing-table, an endless-chain conveyer for feeding articles from the reservoir to the icing-table, means for effecting an intermittent feeding movement of the chain, and means for reversing the movement of the chain at the completion of each feeding movement.

6. In combination, a cake-reservoir, an icing-table, an endless-chain conveyer having pins for engaging the cakes, means for effecting intermittent feeding movement of the chain, and means for reversing the direction of movement of such chain at the completion of every feeding movement.

7. In combination, a cake-reservoir, an icing-table, an endless conveyer having cake-engaging pins, means for effecting intermittent feeding movement of the chain, and means for effecting a reversal of the movement of the chain to a limited extent in order to free the pins from the cakes at the completion of each feeding movement.

8. In combination, a cake-reservoir, an icing-table, an endless chain having pins for engaging the cakes, a ratchet-wheel, a pawl for effecting intermittent feeding movement of the chain conveyer, and a second ratchet-wheel and pawl for reversing the direction of movement of the chain to a limited extent at the completion of each feeding movement.

9. The combination with an endless-chain conveyer having feeding-pins or the like, of a pair of sprocket-wheels, shafts supporting the wheels, a ratchet-wheel carried by one of the shafts, a pawl engaging said ratchet-wheel, means for operating the pawl, to effect an intermittent feeding movement of the chain, a second ratchet-wheel carried by one of the shafts, a pawl engaging the second ratchet-wheel, and means for operating said pawl to effect a limited movement of the chain the reverse of that which it moves during feeding operation, the forward and reverse movements being alternated.

10. The combination with an icing-machine, of a cake-reservoir having a bottom discharge, and including a plurality of spaced rods, means for adjusting the positions of the rods to alter the horizontal area of the reservoir, a lower table or bottom on which the contents of the reservoir may rest, and means for supporting the lower end of one of said rods at a distance from the bottom of the reservoir proportioned to the thickness of the articles which said reservoir is to contain.

11. The combination with an icing-machine, of a cake-reservoir including a plurality of vertically-disposed rods adjustable to alter the horizontal area of said reservoir, and means for supporting one of said rods in position above the bottom of the reservoir to form a side discharge-opening adjacent to the reservoir-bottom.

12. The combination with an icing-machine, of a cake-reservoir, including a pair of sectional supports, means for adjustably connecting the sections, and parallel rods adjustably connected to said supports, one of said rods being held at a distance above the bottom of the reservoir to form a discharge-opening.

13. The combination with an icing-machine, of a cake-reservoir, including a pair of spaced supports, a pair of rods adjustably mounted thereon, a sectional carrier adjustably secured to said rods, a second sectional carrier connected to the first and supported thereby, and a plurality of rods adjustably connected to the two sectional carriers.

14. The combination with an icing-machine, of a cake-reservoir including a pair of adjustable supporting-rods, a second pair of rods arranged approximately at right angles to the first pair and adjustably supported thereby, a sectional carrier adjustably secured to the second pair of rods, a second carrier supported by the first carrier, and a plurality of rods disposed in vertical position and connected adjustably to the carriers in order to prevent adjustment of the horizontal area of said reservoir.

15. The combination with an icing-applying means, of a cake-receiving table, means for feeding cakes to the table, guards for checking movement of the cake across the table under the impulse of the feeding means, and means for moving said guards into and out of the path of movement of the cakes.

16. The combination with an icing-applying means, of a cake-receiving table, spring-held guards for checking movement of the cakes as they are fed to the tables, and means retracting said guards to permit the discharge of the cake from the table.

17. The combination with icing-applying means, of a cake-receiving table, a pair of spring-held guard-fingers for checking movement of the cakes across the table, means for adjusting the position of the fingers with respect to the center of the table, and means for retracting the fingers to permit the discharge of the cake.

18. The combination with an icing-support having an opening, of a cake-receiving table, a plurality of cake-engaging devices for contact with the edges of the cake, and springs tending to move said engaging devices toward each other.

19. The combination with an icing-support having an opening, of a cake-receiving table, a plurality of rods for engaging the edges of the cakes, and means for moving the rods away from the cakes to permit the discharge of the latter.

20. The combination with an icing-applying means, of a cake-receiving table, a plurality of rods for engaging the edges of the cakes, and means for limiting the inward movement of said rods.

21. The combination with an icing-applying means, of a cake-receiving table, rods for engaging the edges of the cakes, springs tending to move the rods toward each other, and means for automatically spreading the rods to remove the cake.

22. The combination with an icing-applying means, of a cake-receiver, a plurality of rods for engaging the edges of the cakes, means for spreading the rods to permit of the discharge of the cakes and for permitting inward movement of said rods to cake-engaging position.

23. The combination with an icing-support having an opening, of a cake-receiving table, a plurality of rods for engaging the edges of the cake, said rods being yieldable to permit continued movement of the table in the direction of the opening after the rods have come into contact with the support.

24. The combination with an icing-support having an opening, of a cake-receiving table, a plurality of members for receiving the edge of the cake, said members serving as strippers to positively remove the cake after the application of the icing, and means for spreading the members to release said cake.

25. The combination with an icing-support having an opening, a cake-receiving table, a plurality of rods recessed at their upper ends for engaging with the edges of the cake, means for moving both the rods and the table in a vertical direction, a pair of rock-shafts, rocker-arms secured thereto, bars carried by the rocker-arms, auxiliary rocker-arms also secured to the shafts and stops disposed in the path of movement of the auxiliary arms and serving to effect outward movement of the rods to release the cakes.

26. The combination with an icing-support having an opening, of a cake-receiving table, a carrier including a pair of superposed plates, yieldably-mounted cake-engaging rods guided and supported by said plates, rock-shafts carried by the upper plate, a plurality of rocker-arms extending from the shafts, spreader-bars connected in pairs to certain of the rocker-arms, and stops disposed in the path of movement of other rocker-arms and serving by engagement therewith to effect spreading movement of the rods.

27. The combination in an icing-machine, of a cake-receiver including a pair of superposed carrying-plates, lifter-rods secured thereto, means for imparting vertical movement to the lifter-rods, a plurality of cake-engaging rods guided and supported by the plates, the lower ends of said rods passing loosely through the lower plate and being guided in slots in the upper plate, springs on which the rods are supported, slotted strips secured to the upper plate and adjustable to limit movement of the rods, a cake-receiving table, and means for spreading said rods.

28. The combination in an icing-machine, of a cake-receiver including a pair of superposed plates, lifter-rods rigidly secured to the plates, an upper slotted plate, a feed-belt extending through the slot, a slotted table mounted yieldably on the slotted plate, a plurality of cake-engaging rods, means for adjusting the extent of movement of said rods, and means for imparting vertical movement to the lifter-rods.

29. The combination in an icing-machine, of a cake-receiver comprising a plurality of superposed plates, lifter-rods secured to the plates, a spring-mounted table for receiving cakes, guard-fingers for preventing excessive movement of the cakes, rods carrying said guard-fingers, and a cam for moving said fingers to a position below the table.

30. The combination in an icing-machine, of a main table having a central slot, a vertically-movable cake-receiving table also slotted and onto which the cakes are fed, a feed-belt having cake-engaging pins projecting through the slots, an icing device disposed above the cake-receiving table, means for imparting vertical movement to the cake-receiving table independent of the belt, and a discharge-table and deflector for moving the cakes laterally, a chute leading from the discharge-table, and an endless carrier onto which the cakes are discharged from the chute.

In testimony that we claim the foregoing as our own we have hereto affixed our signatures in the presence of two witnesses.

JOB F. SCOTT.
ALBERT B. CURTIS.

Witnesses:
J. P. CRAWFORD,
F. L. MULHOLLAND.